United States Patent

[11] 3,609,215

| [72] | Inventors | Walter Giger, Jr. Wethersfield; Robert A. Fulop, Torrington; Robert L. McCrevey, Canton, all of Conn. |
|---|---|---|
| [21] | Appl. No. | 822,476 |
| [22] | Filed | May 7, 1969 |
| [45] | Patented | Sept. 28, 1971 |
| [73] | Assignee | General Electric Company |

[54] ELECTRIC POWER BUSWAY WITH THERMAL EXPANSION ABSORBING JOINTS
25 Claims, 9 Drawing Figs.

[52] U.S. Cl. .................................................. 174/88 B,
174/84 S, 174/99 B, 339/278 C
[51] Int. Cl. ................................................. H02g 15/08
[50] Field of Search .......................................... 174/88 B,
99 B, 99 E, 88.3, 84.3, 94, 94.1; 339/22 B, 378, 278 C, 114, 115, 116; 200/166 G, 166 B; 29/628, 629, 624

[56] References Cited
UNITED STATES PATENTS

| 2,000,909 | 5/1935 | Alasker | 339/114 X |
| 2,274,422 | 2/1942 | Mahoney et al. | 178/88 B X |
| 2,247,088 | 6/1941 | Hill | 174/88 B |
| 2,820,084 | 1/1958 | Shaw | 174/94 (.1) |
| 2,854,074 | 9/1958 | Frank et al. | 174/94 X |
| 3,002,173 | 9/1961 | Allen | 339/114 X |
| 3,482,202 | 12/1969 | Wallace et al. | 339/278 C X |
| 3,489,846 | 1/1970 | Fehr, Jr. | 174/88 B |

Primary Examiner—Darrell L. Clay
Attorneys—Robert T. Casey, Robert S. Smith, D. M. Schiller, Frank L. Neuhauser and Oscar B. Waddell ABSTRACT: An electric power busway including joints having means allowing relative longitudinal movement of the bus bar sections and having generally planar bus bar contact surfaces, the contact surfaces being scored or grooved to provide lubricant reservoir spaces. Lubricant trapped in the reservoir spaces permits longitudinal movement of the bus bars with respect to each other occurring because of thermal expansion, without excessive wear of the contact surfaces and without harmful increase of electrical resistance and consequent excessive heating of the joint. The construction makes possible a busway system having a large number of busway sections, without use of special thermal expansion-absorbing sections as required by busway systems with prior art-type joints.

INVENTORS
WALTER GIGER, JR.,
ROBERT A. FULOP,
ROBERT L. McCREVEY

BY Robert S. Smith
ATTORNEY

PATENTED SEP 28 1971 3,609,215

INVENTORS
WALTER GIGER, JR.,
ROBERT A. FULOP,
ROBERT L. McCREVEY

BY Robert S. Smith

ATTORNEY

ELECTRIC POWER BUSWAY WITH THERMAL EXPANSION ABSORBING JOINTS

BACKGROUND OF THE INVENTION

1. Field of the Invention.

Our invention relates to electric power conduction busways and, more particularly, to such busways including joints adapted to allow longitudinal movement of connected bus bar sections by sliding at the common contact surfaces of the bus bars. Under normal operating conditions, the individual bus bars as well as the busway housing of an electric power busway are subject to thermal expansion caused by the heat generated as a result of the passage of an electric current throughout the bus bars. The magnitude of the expansion which occurs is a function of the material of which the part is formed. Thus, for example, aluminum bus bars are subject to more thermal expansion per unit of length than are copper bus bars, while the busway housing which is generally made of steel will expand still less per unit of length. Because the frequency of the expansions and contraction cycle is a function of the electrical load on the busway, this often means that one expansion and contraction cycle occurs every 24 hours as loads are added and and removed. In aluminum bus bars, galling of the contact surface (the bus bars digging into each other) can occur after as few as 13 expansion and contraction cycles. In copper bus bars, galling can occur after 500 cycles. Such galling raises the electrical resistance of the joint, leading to undesirable heating. Such galling also increases the friction between the two bus bars and can eventually prevent the desired sliding action, leading to physical damage in some other part other part of the system.

2. Description of the Prior Art.

Normally in short runs of busway, such as 30 feet or less, the effect of thermal expansion, even when accumulative amounts thereof are considered, is not significant enough to cause any problem. Thermal expansion, however, can become a problem in longer runs of busway as well as in those installations wherein both ends of the busway are fixed either horizontally or vertically, such as by being fixed to or abutting against a portion of a building. The forces created as the result of thermal expansion have been, for example, strong enough in those installations wherein both ends of the busway are fixed to cause the individual bus bars to bow outwardly resulting in failures due to breakdowns in insulation, etc. With vertically mounted busway systems wherein the busway housing is supported at each individual floor as it passes therethrough, the forces created as a result of thermal expansion have been strong enough to cause some of the supports to rip out and thereby force the remainder of the supports to carry the entire weight of the busway system which they may or may not be able to do, but which in any event is undesirable.

The most common means for compensating for this thermal expansion has been the use of special "expansion lengths" or sections, one or more of which is inserted in a busway "run" or system. Such expansion lengths commonly include laminated or braided conductor material which is therefore relatively flexible. An example of such a prior art expansion section is shown in the application Ser. No. 741,644 filed July 1, 1968 of Lawrence C. Goodridge now U.S. Pat. No. 3,485,936 issued Dec. 23, 1969 assigned to the same assignee as the present invention. The use of special expansion sections is less than satisfactory, however, because the expansion section involves a construction which is bulky, more difficult to insulate, and expensive. The necessity for foreseeing the need for such special sections and the need for stocking, ordering, and installing such special sections add substantially to the time and cost of busway systems. In addition, when braided or laminated expansion-type joints are utilized, ordinarily one joint would be used between a series of rigidly fastened busway sections. It is, therefore, often necessary to utilize special spring mounting devices to secure the rigidly connected busway sections to transmit the longitudinal expansion of those busway sections to the expansion section.

OBJECTS OF THE INVENTION

The primary object of the present invention is to provide an electric power busway having means for accommodating thermal expansion wherein the thermal expansion accommodating means is incorporated in the standard busway sections without requiring use of special expansion-absorbing sections.

It is another object of the invention to provide an electric power busway including connecting joints for busway sections, which joints are capable of permitting relative sliding movement of overlapped bus bar contact surfaces to absorb thermal expansion, without harmful effects, such as undue wearing, galling, or excessive heating, It is a particular object to provide such a busway capable of using aluminum bus bars.

It is still another object of the invention to provide this busway joint without requiring any additional materials (except lubricant) and that may be accomplished with conventional metal working techniques. Yet another object of the present invention is to provide an electric power busway having means of accommodating thermal expansion wherein the thermal expansion accommodating means may be utilized with equal effectiveness irrespective of whether the busway is mounted in a horizontal or vertical position.

It is an object of the present invention to provide an electric power busway having means for accommodating thermal expansion wherein the busway with such means remains simple in construction, but easy to manufacture, and low in cost.

SUMMARY OF THE INVENTION

In accordance with the present invention, there is provided an electric power busway having bus bar contact surfaces for mating with corresponding bus bar contact surfaces. Mean is provided to allow relative movement of the contact surfaces due to thermal expansion and contraction of each bus bar along its longitudinal axis. In addition, the contact surfaces are each provided with a scored face to provide a reservoir for lubrication material. The invention will be more fully understood from the following detailed description and its scope will be pointed out in the appended claims.

DESCRIPTION OF THE PREFERRED EMBODIMENT

Figure 1:
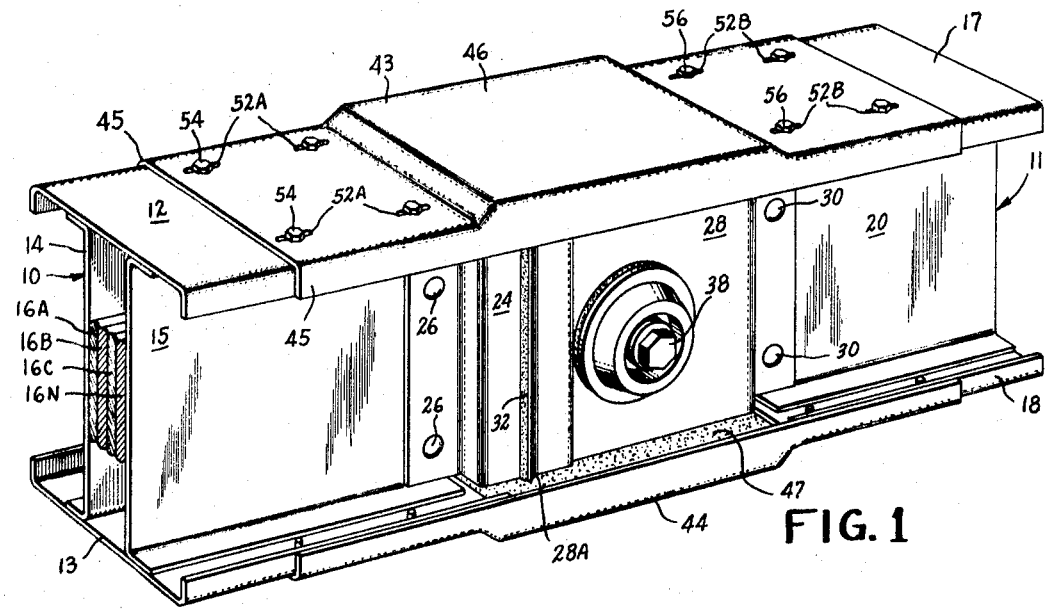
FIG. 1 is a perspective view of a joint portion of an electric power busway incorporating the present invention.
Figure 2:
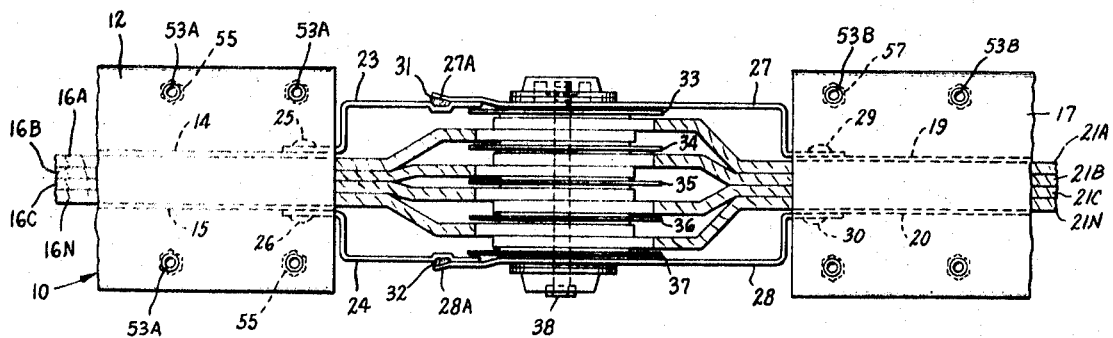
FIG. 2 is a plan view, with the housing top and bottom covers removed, of the joint of FIG. 1.

Referring now to FIGS. 1 and 2, the invention is shown as incorporated in an electric power busway apparatus comprising a pair of interconnected busway sections 10 and 11 respectively. The busway section 10 includes a pair of generally channel-shaped top and bottom members 12 and 13 respectively interconnected by the pair of generally channel-shaped side members 14 and 15 respectively. A plurality, in this case four, of insulated bus bars 16A, 16B, 16C, and 16N, preferably of aluminum, are supported by suitable insulating means, now shown, within the housing defined by the top and bottom members 12 and 13 and side members 14 and 15. Similarly, the busway section 11 comprises top and bottom members 17 and 18 interconnected by side members 19 and 20, and containing bus bars 21A, 21B, 21C, and 21N respectively.

As best seen with reference to FIG. 2, the top and bottom members 12 and 13 of busway section 10 and the top and bottom members 17 and 18 of busway section 11 are discontinued short of the joint location. The side members 14 and 15 of section 10 are, however, extended slightly by extensions 23 and 24 respectively, attached to the housing side members by suitable means, such as welding, bolts and nuts, or rivets 25 and 26 respectively. Likewise, the side members 19 and 20 of the section 11 are extended by relatively longer extensions 27, 28, attached to the side members 19 and 20 by suitable means, such as by rivets 29 and 30. The side extensions 27 and 28 extend beyond the joining portion of the joint and terminate in outwardly directed end portions 27A, 28A for a purpose to be described.

A strip of resilient gasketing material 31, 32 is attached to each of the side extensions 23 and 24. When the housing sections are brought together in the assembled conditions as indicated in FIG. 2, the outwardly flared portions 27A, 28A of the side extensions 27 and 28 overlap the side extensions 23 and 24, and engage the gasket strips 31, 32 respectively, so that when the joint is clamped together these surfaces provide a tight seal for the side members.

Figure 3:
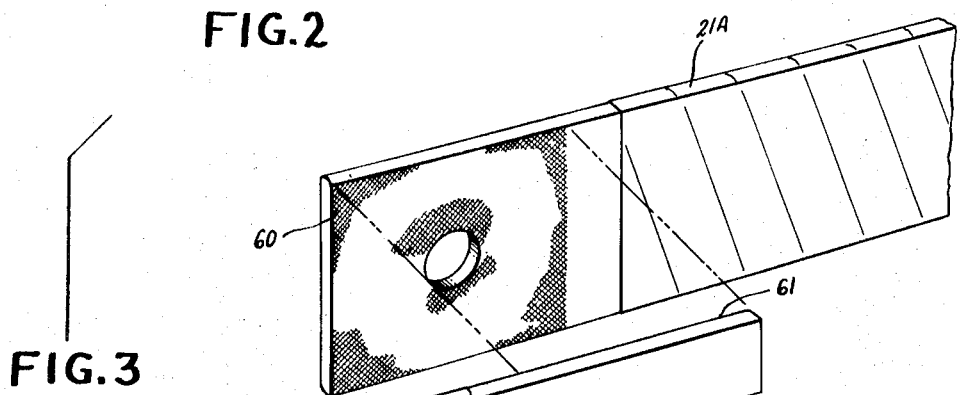
FIG. 3 is a perspective view of the bus bar contact portions of the joint of FIGS. 1 and 2.

The ends of the bus bar 16A, 16B, and 16N are outwardly offset, and the ends of the bus bar 21A, 21B, 21C, and 21N of the section 11 are also outwardly offset so as to overlap as shown in FIG. 2 when the busway sections are brought together. The overlapped bus bar ends are insulated from each other by generally rectangular platelike rigid insulators 33, 34, 35, 36, and 37, each attached to one of the bus bars 21A, 21B, 16C, 21C, and 21N respectively. The bus bar ends 21A, 21B, 21C, and 21N are provided with holes, and bus bar ends 16A, 16B, 16C, and 16N are provided with slots for the purpose of receiving an insulated clamping bolt 38 which passes through the complete assembly comprising the side member extensions 27, 28, insulators 33, 34, 35, 36, and 37, and overlapped bus bar ends to clamp the bus bars together in a manner more particularly shown and described in U.S. Pat. No. 3,365,537 assigned to the same assignee as the present invention. The hole and slot portions of bus bars 21A and 16A which are typical are shown in FIG. 3. It will thus be apparent that pressure by the bolt 38 on the side member extensions 27, 28 urging them inwardly toward each other will compress the flange portions 27A, 28A of the extensions 27, 28 against the gasket strips 31, 32 of the extensions 23, 24 to thereby provide a tight seal.

The housings of the busway sections 10 and 11 are adapted to be interconnected by means of the joint cover members 43 and 44 as shown in FIG. 1. Inasmuch as the joint cover members 43 and 44 are identical, the description thereof will be limited to joint cover member 43 as best seen with reference to FIG. 1. Joint cover member 43 is of a generally planar sheet-metal construction having downwardly turned flange portions 45 at opposite edges thereof, and a raised central portion 46 in which is provided a gasket 47 of resilient material for sealing the joint. In addition, the cover member 43 if provided with four elongated bolt-receiving holes 52A and four elongated bolt receiving holes 52B, the sections 10 and 11 with respect to the joint cover members 43 position to holes 53A and 53B provided in the top members 12 and 17 of the busway sections 10 and 11 respectively.

In order to interconnect the joint cover members 43 and 44 to the busway sections 10 and 11, the busway housings are first brought into substantially end-to-end aligned abutting relation with the corresponding bus bar sections 10 and 11 positioned in side-by-side relation as best seen in FIG. 2. The joint cover member 43 is then attached in a preliminary manner by inserting bolts 54 through holes 52A in cover member 43, into holes 53A in the top member 12 of busway section 10 and threading them into suitable retaining means, such as the nuts 55 welded to the inner surface of the top member 12 of the section 10. Bolts 56 are inserted into the holes 52B in the cover member 43 and into holes 53B in the top member 17 of section 11, and are threaded into the nuts 57 welded to the inner surface of the top member 17 of section 11. Thereafter the bolts 54 and 56 are tightened to compress the gasket 47, thereby allowing the surface of the joint cover member 43 to bottom against the outer surface of the top members 12 and 17 as seen in FIG. 1. The joint cover member 44 is similarly interconnected to the bottom members 13 and 18 of the busway sections 10 and 11 respectively.

The bolt-receiving holes 52A and 52B are elongated for the purpose, noted before, of allowing longitudinal movement of the metallic housing such as that resulting from thermal expansion from the heat generated inside the housing by virtue of the passage of electrical current through the bus bars enclosed therein. Certain aspects of the joint housing structure shown and described herein are disclosed now U.S. Pat. No. 3,489,846 issued Jan. 13, 1970 and claimed in copending application Ser. No. 671,662, filed Sept. 29, 1967, by J. G. Fehr, Jr., and assigned to the same assignee as the present invention.

Although the bus bar ends 16A—16N and 21A—21N are secured in side-by-side relation by means of the clamping bolt 38 tightly enough to provide a good electrical interconnection therebetween, the forces created as a result of the thermal expansion of the bus bars are nevertheless strong enough to cause the bus bar ends to slide longitudinally relative to each other.

Inasmuch as the movement resulting from the thermal expansion is provided for at each joint in the busway run, the joints generally being spaced approximately 10 ft. apart, there is no necessity for utilizing one or more of the braided or laminated expansion-type sections in the busway run. In the prior art busway joint which do not have expansion sections, it is desireable to prevent the bus bar ends from moving at the joint to any significant degree relative to each other in order to insure that no galling occurs. This is ordinarily accomplished by increasing the amount of torque applied to the clamping bolt 38 whereby the clamping force causes frictional forces between the bus bar ends which exceed the restraining forces imposed on the busway system by mounting hangers, end conditions, etc., or in the case of vertical installations, the weight of the bus bars themselves.

Figure 4:
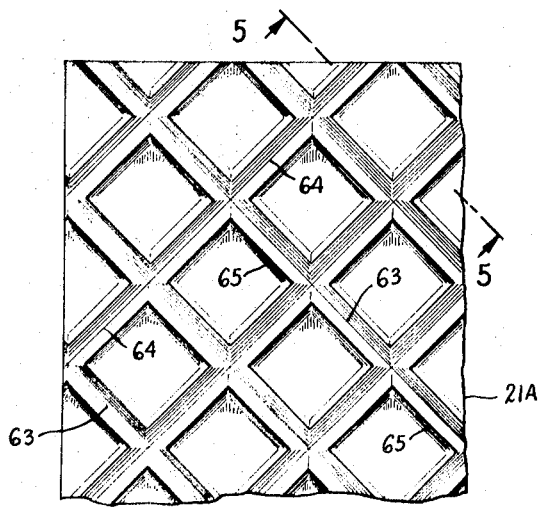
FIG. 4 is a plan view, on a greatly enlarged scale, showing the scored bus bar contact surface in greater detail.
Figure 5:
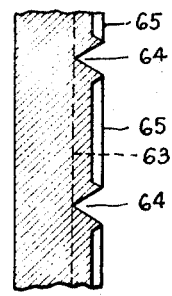
FIG. 5 is a cross-sectional view of a portion of the contact surface taken along the line 5—5 of FIG. 4.

Referring now to FIGS. 3, 4, and 5, the contact surface 60 of the bus bars is shown in accordance with the applicant's novel busway joint construction. The invention is applicable to either copper or aluminum bus bars but if aluminum conductors are used, a 1,000 microinch nickel plate is applied to the indented face contact surface 60 prior to forming of the channel portions. The mating face contact surface 61 is smooth. If made of copper, no coating is required on smooth surface 61 if made of aluminum, preferably a copper coating approximately 0.0125 to 0.0325 inch thick should be applied to smooth surface 61. The contact surface 60 is provided with a grooved pattern comprising a plurality of first parallel spaced-apart channels 63 (see FIG. 4) obliquely positioned with respect to the longitudinal axis of the bus bar section 21A and a plurality of parallel spaced-apart channels 64 that are perpendicular to the first channels 63. The channel portions 63, 64 may be formed by stamping, in which case the metal displaced from the formed channel will tend, depending upon the shape of the die, to form a flange adjacent the side edge of each channel portion at its upper surface as best shown in the cross-sectional view of FIG. 5. If the channel portions 63 and 64 are formed by milling or similar means, the flange portions 65 will not be present. The channel portions 63, 64 are preferably about 0.010 inch wide and 0.005 inch deep. The parallel channels are spaced about 0.0625 inch deep. The parallel channels are spaced about 0.0625 inch apart. The channels 63, 64 serve to retain a lubricant in small reservoirs at the contact surface which prevents galling. While the particular lubricant used may vary, it should preferably be a dry film lubricant, such as molybdenum disulfide or powdered graphite. Other possible lubricants include noibium diselenide or molybdenum diselenide powder, conventional metallic stearate or petroleum oils, and carnauba synthetic waxes.

Figure 7:
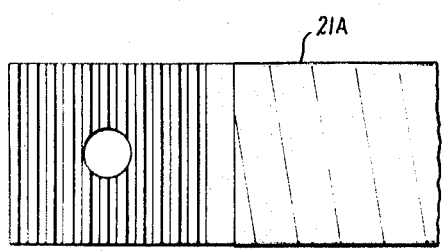
FIGS. 7, 8, and 9 are plan views showing alternative scored bus bar contact portions of the joints of FIGS. 1 and 2.
Figure 8:
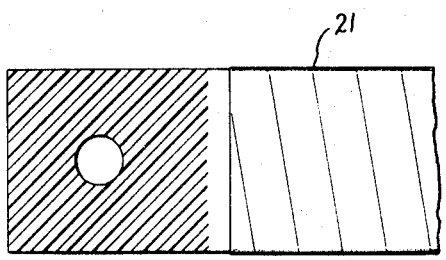
Figure 9:
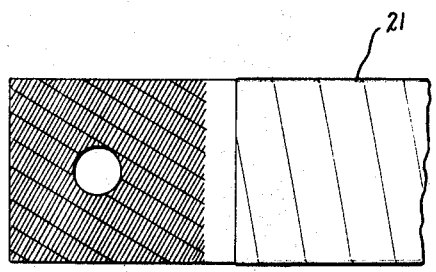

Referring now to FIGS. 7, 8, and 9, alternatives to the parallel channel construction where first parallel channels are obliquely positioned with respect to the longitudinal axis of the bus bar and second parallel channels are positioned at right angles to the first parallel channels, the channeled pattern may comprise solely parallel spaced-apart channels obliquely positioned with respect to the longitudinal axis of the bus bar or parallel spaced-apart channels at right angles to the longitudinal axis of the bus bar or parallel spaced-apart channels parallel to the longitudinal axis of the bus bar or some other variation. As still another alternative to the channel construction itself, a plurality of indentations may be made in the contact surface 60 to form the reservoir desired for the lubricant. Any one of these reservoir patterns may be formed by a hardened steel punch having raised ribs in the desired pattern similar to a metal-cutting file.

When the bus bars have end portions directly engaging each other to form an overlapping joint, such as is shown in FIG. 2, a scored face is utilized on only one of each pair of mating contact surfaces requiring longitudinal freedom of motion. The contact surface of the other bus bar end is not indented. Since the longitudinal travel in a single joint of the type described is adequate to absorb the thermal expansion and contraction of an entire bus bar and only one indented surface is required per bus bar joint, it is adequate to provide only one indented contact surface on every bus bar section located in an overlapping bus bar run (a "bus bar section" is a single-bus bar, such as 16A, 16B, 16C, 16N). Manufacturing costs can be minimized in this manner.

Figure 6:
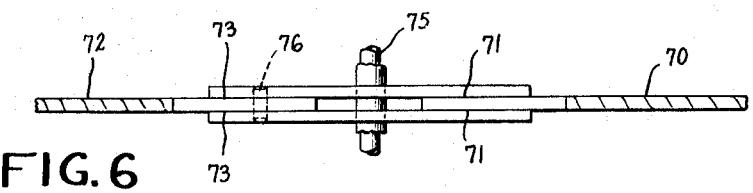
FIG. 6 is a plan view of an alternate bus bar joint construction utilizing splice plates to connect aligned, nonoverlapping bus bars.

An alternative to the overlapped bus bar construction is a splice-plate arrangement, such as that shown in FIG. 6. In this construction, a bus bar 70 is provided with opposed contact surfaces 71, each of which has an indented lubrication reservoir. The next bus bar 72 in the bus bar run is not provided with a lubrication reservoir at the end shown, but instead, and its contact surfaces 73 are relatively smooth. The contact surfaces 71 and 73 of bus bars 70 and 72 respectively are connected by conductive splice-plates 74. A sack of tie-plates and bus bar contact portions are compressed together by an insulated through-bolt 75. A pin 76 is provided to prevent longitudinal movement of bus bar 72 with respect to splice-plates 74 and thereby insure that the contact surfaces 71 having the lubrication reservoir actually have the longitudinal movement occur at the desired portion.

The particular busway configuration and bus bar arrangement may, of course, be varied, and copper may be used as the bus bar material rather than aluminum. The invention may also be used in other types of connections, such as in the connection of feeder busway sections to a point intermediate the extremities of another busway section, without altering the applicability of the invention, and we therefore intend to cover all such modifications as fall within the true spirit and scope of the invention.

We claim:

1. An electric power distribution system of the busway type comprising:
   q. a plurality of longitudinally aligned prefabricated elongated busway sections, each of said sections comprising a ductlike metalic housing and a plurality of electric power bus bars supported in parallel insulated relation in said housing;
   b. connecting means connecting said bus bars of each of said adjacent busway sections;
   said connecting means comprising thermal expansion absorbing means interconnecting said bus bars of at least two of said busway sections and permitting relative longitudinal sliding movement of said bus bars of said two busway sections; and
   d. said bus bars having first end portions with at least one side contact surface;
   e. said first end portions of bus bars in each busway section being disposed in juxtaposed relation to second end portions of bus bars in an adjacent busway section;
   f. a splice plate overlapping said first and second bus bar end portions and having a side contact surface in contact with at least said one side contact surface of said first end portions, and
   g. lubricant retaining reservoirs in at least one of said surfaces, said lubricant reservoirs comprising a large number of small indentations formed therein serving to receive minute particles of conductor material produced by said sliding movement of said bus bars of said two busway sections and to store small amounts of said lubricating material.

2. An electric power distribution system as set forth in claim 1 wherein said system comprises a pair of splice plates having portions overlapping said end portions of each bus bar, and clamping means intermediate said end portions clamping said pair of splice plates toward each other and against said bus bar end portions.

3. An electric power distribution system as set forth in claim 1 wherein said splice plates have at least said side contact surfaces thereof composed of copper.

4. An electric power distribution system as set forth in claim 3 wherein system also includes a lubricating material between said contact surfaces comprising a material selected from the class comprising molybdenum disulfide and powdered graphite.

5. An electric power distribution system as set forth in claim 1 wherein said system also includes a lubricating material between said contact surfaces comprising a material selected from the class comprising in molybdenum disulfide and powdered graphite.

6. An electric power distribution assembly comprising:
   a. at least one pair of electric power bus bars, said bus bars being disposed relative to each other with end portions thereof in overlapping relation;
   b. at least one of said overlapping end portions having a generally planar contact surface having indented portions;
   c. means continuously biasing said overlapping end portions into effective electrical contact with each other;
   d. means rigidly supporting said bus bars in said assembly while permitting relative longitudinal movement of said overlapping end portions;
   e. said indented portions comprising a plurality of parallel channel portions, said channel portions comprising a first set of spaced parallel channel portions and a second set of spaced parallel channel portions disposed at right angles to said first channel portions.

7. An electric power distribution assembly as set forth in claim 6, said assembly further including a molybdenum disulfide lubricant between said end portions.

8. An electric power distribution assembly as set forth in claim 6, said assembly also including a graphite lubricant between said end portions.

9. An electric power distribution assembly as set forth in claim 6 wherein said channel portions are approximately 0.010 inches wide and 0.005 inches deep.

10. An electric power distribution assembly as set forth in claim 9 wherein said parallel spaced-apart channel portions are spaced approximately 0.0625 inches apart.

11. An electric power distribution assembly comprising:
   a. at least one pair of electric power bus bars, said bus bars being disposed relative to each other in substantial alignment with end portions thereof in closely spaced relation;
   b. a generally planar splice plate having contact portions overlapping said closely spaced end portions of said bus bars;
   c. said end portion of at least one of said bus bars having a contact surface portion thereof engaged by said splice plate, said contact surface portion having a plurality of indentations thereon;
   d. means continuously biasing said overlapping end portions of said splice plate and said bus bars into effective electrical contact;

c. means rigidly supporting said bus bars in said assembly while permitting relative longitudinal movement between said splice plate and at least said one of said bus bars;

f. said indentations comprising a plurality of parallel channel portions;

g. said channel portions comprising the first set of parallel channel portions and a second set of parallel channel portions disposed at right angles to said first set of channel portions.

12. An electric power distribution assembly as set forth in claim 11 said assembly further including molybdenum disulfide lubricant between said contact surface of said one bus bar and said splice plate.

13. An electric power distribution assembly as set forth in claim 11 said assembly further comprising a graphite lubricant between said contact surface portion of said one bus bar and said splice plate.

14. An electrical power distribution assembly as set forth in claim 11 wherein said channel portions are approximately 0.010 inches wide and 0.005 inches deep.

15. An electrical power distribution assembly as set forth in claim 14 wherein said parallel spaced-apart channel portions are spaced approximately 0.0625 inches apart.

16. An electrical power distribution assembly comprising:

a. at least one pair of electrical power bus bars, said bus bars being disposed relative to each other with portions thereof in overlapping relation;

b. said overlapping portions of said bus bars comprising interengaging generally planar contact surfaces;

c. means continuously biasing said contact surfaces of said bus bars into effective electrical contact with each other;

d. means supporting said bus bars in said assembly, said supporting means permitting relative longitudinal movement of said contact surfaces;

e. at least one of said generally planar contact surfaces having a large number of relatively small lubricant reservoirs therein, and f. a lubricating material between said interengaging contact surfaces and in said lubricant reservoirs.

17. An electric power distribution assembly as set forth in claim 16 wherein said lubricating material comprises a solid lubricating material.

18. An electric power distribution assembly as set forth in claim 16 wherein said lubricating material comprises a material selected from the group consisting of molybdenum disulfide and graphite.

19. An electric power distribution assembly as set forth in claim 16 wherein the other of said contact surfaces wherein the other of said contact surface comprises a smooth flat surface.

20. An electric power distribution assembly as set forth in claim 16 wherein said bus bars are of aluminum and wherein said one contact surface has a coating of nickel thereon.

An electric power distribution assembly as set forth in claim 16 wherein the metal of both of said contacting surfaces comprises copper.

22. An electric power distribution assembly as set forth in claim 16 wherein said bus bars comprise aluminum, said one contact surface having a coating of nickel thereon and the other of said contact surface having a coating of copper thereon.

23. An electric power distribution assembly as set forth in claim 16 wherein said lubricant reservoirs comprise a set of parallel closely spaced narrow, shallow channels or grooves.

24. An electric power distribution assembly as set forth in claim 16 wherein said lubricant reservoirs comprise a first set of parallel channels and a second set of parallel channels crossing said first said of parallel channels at an angle thereto.

25. An electric power distribution assembly as set forth in claim 16 wherein said lubricant reservoirs comprise a large number of closely spaced, substantially evenly distributed discrete indentations.